(12) United States Patent
Chang et al.

(10) Patent No.: US 9,335,795 B2
(45) Date of Patent: May 10, 2016

(54) ELECTRONIC DEVICE WITH KEYBOARD

(71) Applicant: HON HAI PRECISION INDUSTRY CO., LTD., New Taipei (TW)

(72) Inventors: Chia-Ming Chang, New Taipei (TW); Yi-Cheng Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 153 days.

(21) Appl. No.: 14/252,211

(22) Filed: Apr. 14, 2014

(65) Prior Publication Data

US 2015/0002997 A1    Jan. 1, 2015

(30) Foreign Application Priority Data

Jul. 1, 2013  (TW) .............................. 102123554 A

(51) Int. Cl.
*G06F 1/16*    (2006.01)

(52) U.S. Cl.
CPC ............ *G06F 1/1669* (2013.01); *G06F 1/1616* (2013.01); *G06F 1/1662* (2013.01)

(58) Field of Classification Search
CPC ..... G06F 1/1669; G06F 1/1679; G06F 1/165; G06F 1/1613; G06F 1/1616; G06F 1/1666; G06F 1/1626; G06F 1/1601; G06F 1/1611
USPC ............... 361/679.08–679.17, 679.21–679.3, 361/679.55–679.56, 68, 679.1–679.61, 361/725–726; 345/168; 235/145; 400/682
See application file for complete search history.

(56) References Cited

U.S. PATENT DOCUMENTS

| | | | |
|---|---|---|---|
| 2004/0189017 A1* | 9/2004 | Chen .................... | E05B 63/248 292/251.5 |
| 2005/0286215 A1* | 12/2005 | Yang .................... | G06F 1/1679 361/679.27 |
| 2006/0006674 A1* | 1/2006 | Kang .................... | E05C 19/16 292/251.5 |
| 2008/0218953 A1* | 9/2008 | Yun ...................... | E05B 47/004 361/679.57 |
| 2010/0053857 A1* | 3/2010 | Zhu ...................... | E05B 15/101 361/679.01 |
| 2011/0012846 A1* | 1/2011 | Zhu ...................... | G06F 1/1624 345/173 |
| 2012/0106065 A1* | 5/2012 | Yu ........................ | E05B 15/022 361/679.27 |
| 2012/0236480 A1* | 9/2012 | Yoo ...................... | H04M 1/0262 361/679.01 |
| 2013/0016460 A1* | 1/2013 | Yeh ...................... | G06F 1/1679 361/679.01 |
| 2013/0038988 A1* | 2/2013 | Chen .................... | G06F 1/1677 361/679.01 |

* cited by examiner

*Primary Examiner* — Zachary M Pape
*Assistant Examiner* — Amir Jalali
(74) *Attorney, Agent, or Firm* — Novak Druce Connolly Bove + Quigg LLP

(57) ABSTRACT

An electronic device with a clip-fixed keyboard includes a cover; a first magnetic member moveably attached to the cover, a base, and a keyboard. A first resilient member is located between the cover and the first magnetic member. A second magnetic member is movable attached to the base. The keyboard includes a clipping portion engaged with the first magnetic member. The second magnetic member is moveable relative to the base in a first direction, to move the first magnetic member in a second direction which is perpendicular to the first direction, so that the first magnetic member disengages from the clipping portion.

17 Claims, 5 Drawing Sheets

ELECTRONIC DEVICE WITH KEYBOARD

FIELD

The present disclosure relates to electronic devices, and particularly to a keyboard for an electronic device.

BACKGROUND

A personal computer will often include a keyboard and a base. The keyboard may be attached to the base with screws. A screwdriver or similar tool may be required to fasten or unfasten the screws when the keyboard is assembled or disassembled. The processes of assembling or disassembling the keyboard may be laborious and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
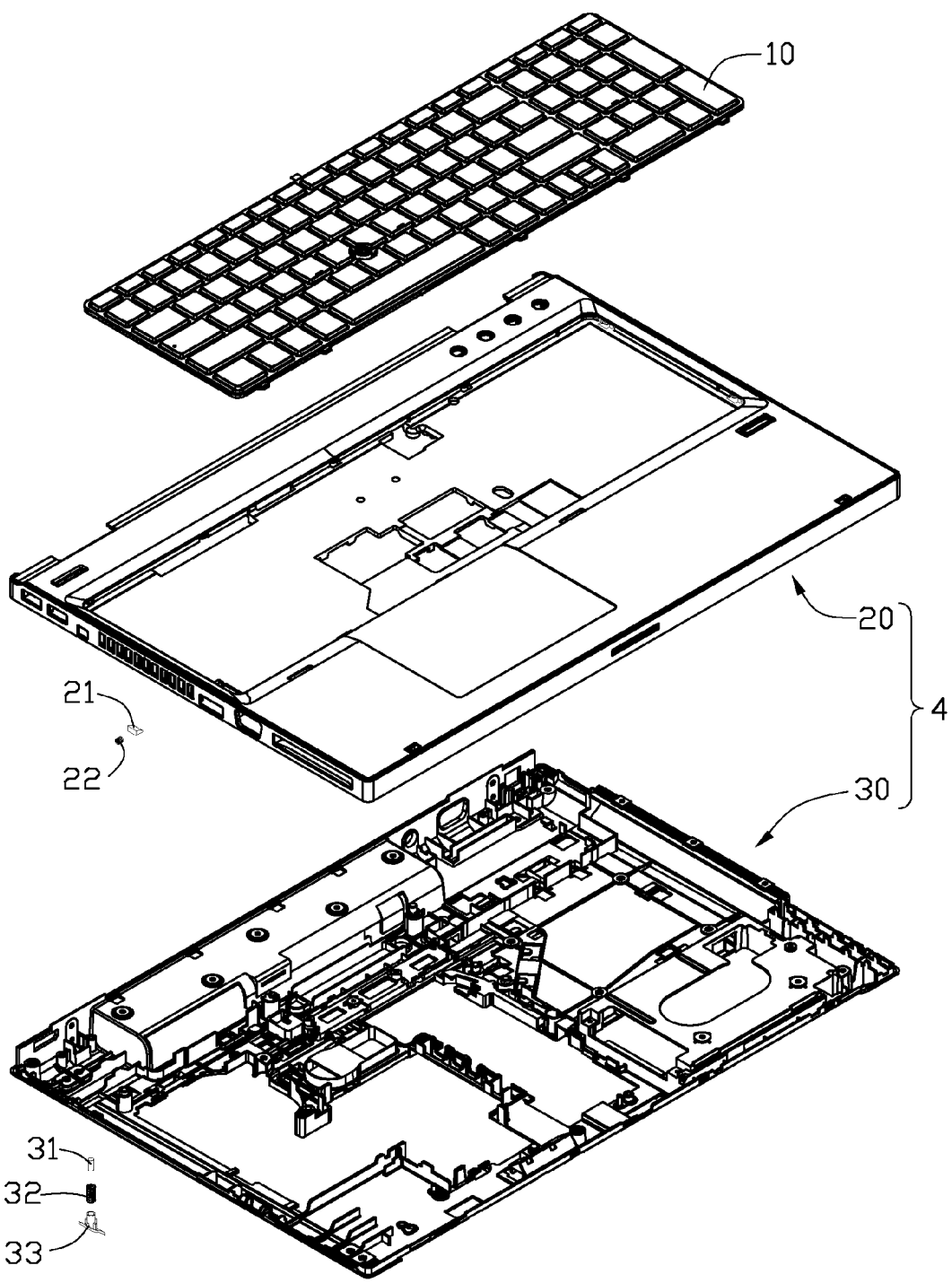
FIG. 1 is an exploded, isometric view of an electronic device and a keyboard in accordance with an embodiment.
Figure 2:
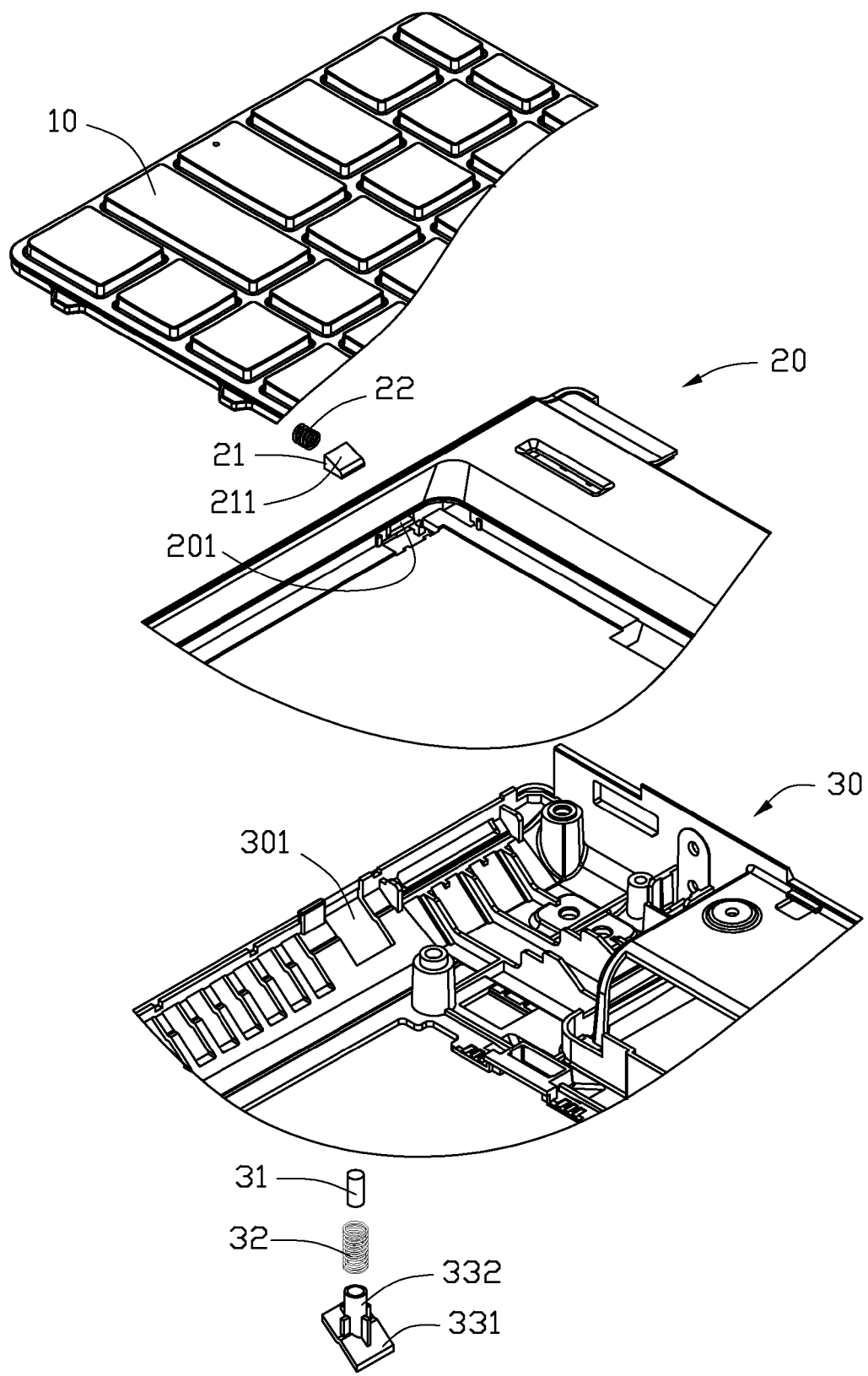
FIG. 2 is similar to FIG. 1, but viewed from a different aspect.

FIGS. 1-2 illustrate an electronic device in accordance with an embodiment. The electronic device comprises a mounting assembly 4 and a keyboard 10 attached to the mounting assembly 4. In at least one embodiment, the electronic device maybe a notebook. The keyboard 10 comprises a clipping portion 101.

The mounting assembly 4 comprises a base 30 and a cover 20 attached to the base 30. A receiving portion 201 is located on the cover 20. The receiving portion 201 comprises a bottom panel 203, a top panel 202 above the bottom panel 202, and a connecting panel 205 connected to the bottom panel 203. In at least one embodiment, the connecting panel 205 is substantially perpendicular to the bottom panel 202, the bottom panel 203 is a horizontal panel, and the top panel 203 is slanted relative to the bottom panel 203. A first magnetic member 21 is located in the receiving portion 201 and the first magnetic member 21 has a slanted surface 211 attached to the top panel 203. A first resilient member 22 is located between the connecting panel 205 and the first magnetic member 21.

The base 30 defines a through hole 301 corresponding to the receiving portion 201. A pushing member 33 is moveably received in the through hole 301. The pushing member 33 comprises a pushing portion 331 and a mounting portion 332 connected to the pushing portion 331. The mounting portion 332 is a hollow post. A second magnetic member 31 is received in the mounting portion 332, and a second resilient member 32 is located between the bottom panel 203 and the pushing portion 331. In at least one embodiment, the first and second resilient members 22, 32 are both springs. The polarities of the first and second magnetic members 211, 31 are the same, so that the first and second magnetic members 211, 31 are repulsed from each other.

Figure 3:
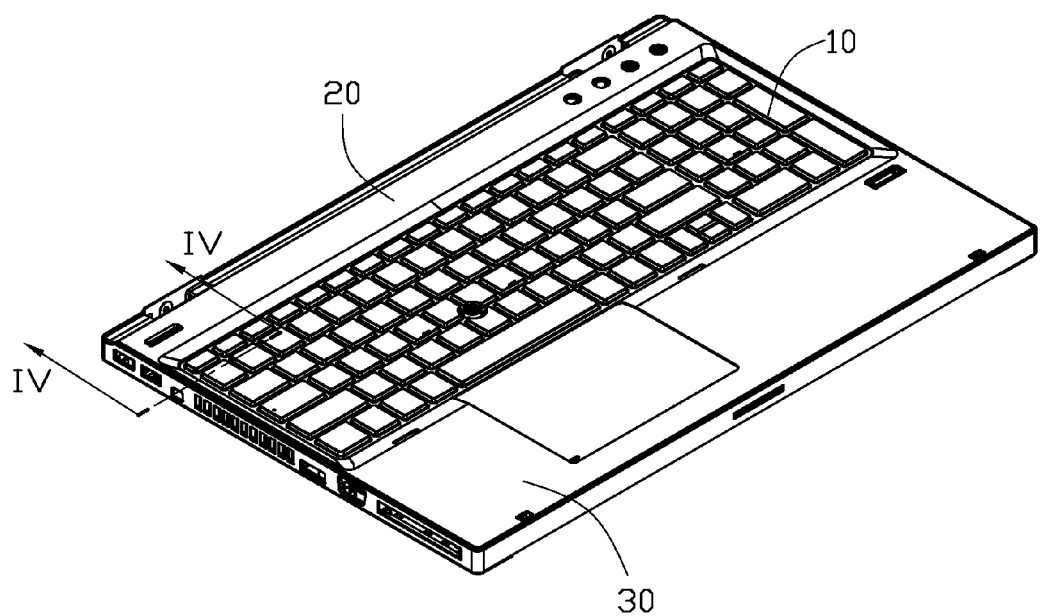
FIG. 3 is an assembled view of the electronic device of FIG. 1.
Figure 4:
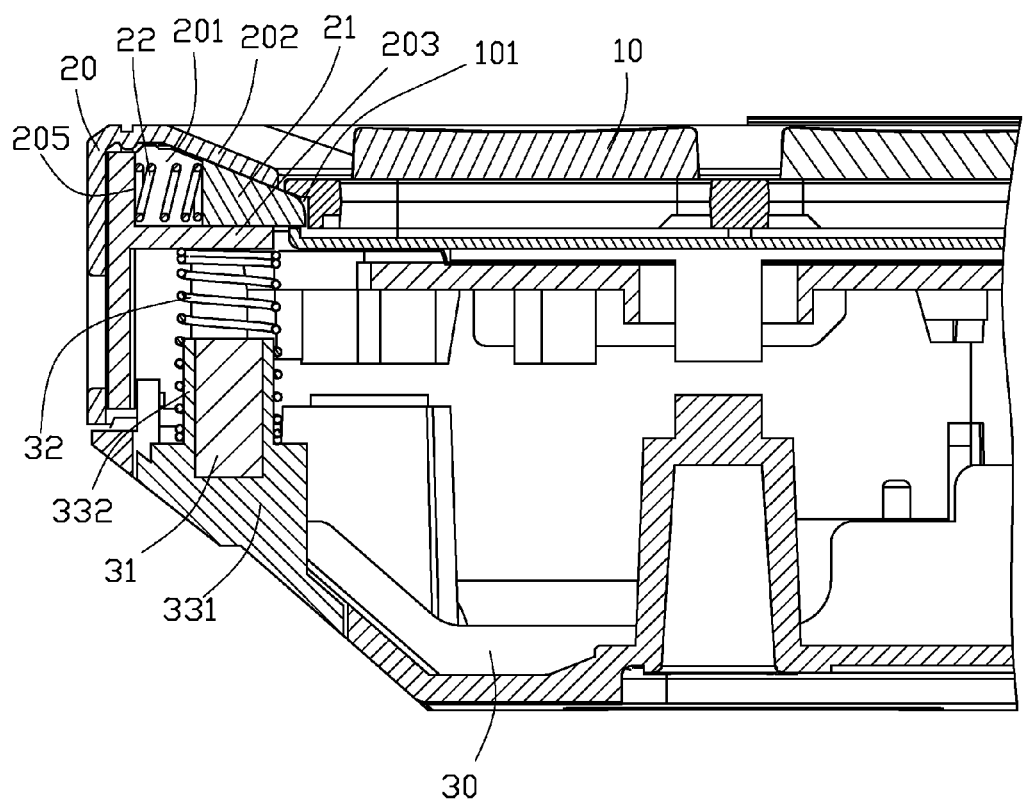
FIG. 4 is a cross-sectional view of FIG. 3, taken along a line IV-IV, and a pushing member of the electronic device is located on a first position.
Figure 5:
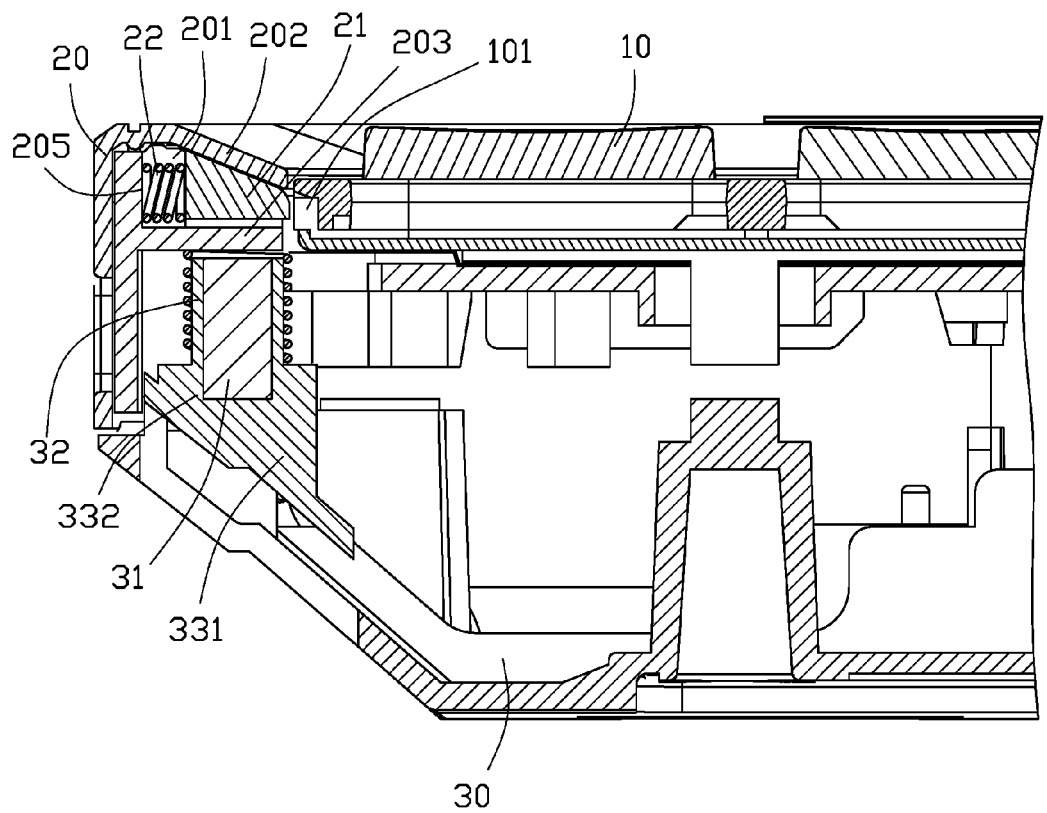
FIG. 5 is similar to FIG. 4, and the pushing member of the electronic device is located on a second position.

FIGS. 3-5 illustrate assembly of the electronic device of an embodiment. The first magnetic member 21 is received in the receiving portion 201. A first end of the first resilient member 22 is engaged with the connecting panel 205, and a second opposite end of the first resilient member 22 is engaged with the first magnetic member 21 to position the first resilient member 22 between the first magnetic member 21 and the connecting panel 205. The second magnetic member 31 is received in the mounting portion 332. The second resilient member 32 surrounds the mounting portion 32 and extends through the through hole 301. A first end of the second resilient member 32 is engaged with the bottom panel 203, and a second opposite end of the second resilient member 32 is engaged with the pushing portion 331. Thus, the pushing member 33, with the second resilient member 32 and the second magnetic member 31, is moveably attached to the bottom panel 203 and located in a first position. When the pushing member 33 is located in the first position, each of the first and second resilient members 22, 32 is substantially uncompressed and has a greatest length, and a first distance is defined between the first magnetic member 21 and the second magnetic member 31. A first repulsive force between the first magnetic member 21 and the second magnetic member 31 is less than an elastic force of the first resilient member 22 on the first magnetic member 21, so that the first resilient member 22 urges the first magnetic member 21 to be exposed out of the receiving portion 201 (see FIG. 4).

In assembly, the keyboard 10 is aligned with the cover 20 and pressed towards the cover 20. When the first magnetic member 31 latches with the clipping portion 101, the keyboard 10 is secured to the cover 20 (see FIG. 4).

In disassembly of the keyboard 10, the pushing portion 331 is pushed towards the bottom panel 203 in a direction substantially perpendicular to the bottom panel 203. The second resilient member 22 is deformed, and a second distance, less than the first distance, is defined between the first magnetic member 21 and the second magnetic member 31. A second repulsive force between the first magnetic member 21 and the second magnetic member 31 is now greater than the elastic force of the first resilient member 22 on the first magnetic member, so that the first magnetic member 21 is moved away from the second magnetic member 31. Since the slanted surface 211 abuts the top panel 202, when the first magnetic member 21 is moved away from the second magnetic member 31, the top panel 202 urges the first magnetic member 21 to move in a second direction substantially perpendicular to the first direction. Thus, the first magnetic member 21 is moved to disengage from the clipping portion 102, and the keyboard 10 can be detached from the cover 20. The first resilient member 22 is deformed by the first magnetic member 21. At this time, the pushing member 33, with the second resilient member 32 and the second magnetic member 31, is located in a second position (see FIG. 5). When the clipping portion 102 is disengaged from the first magnetic member 21, the pushing member 30 is moved to the first position. The first repulsive force between the first magnetic member 21 and the second magnetic member 31 is now less than the elastic force of the first resilient member 22 on the first magnetic member 21, and the first resilient member 22 is released to urge the first magnetic member 21 to the first position.

Even though numerous characteristics and advantages have been set forth in the foregoing description of embodiments, together with details of the structures and functions of the embodiments, the disclosure is illustrative only and changes may be made in detail, including in the matters of shape, size, and arrangement of parts. The disclosed embodiments are illustrative only, and are not intended to limit the scope of the following claims.

What is claimed is:

1. An electronic device comprising:
    a cover;
    a first magnetic member moveably attached to the cover, and a first resilient member located between the cover and the first magnetic member;
    a base;
    a second magnetic member movable attached to the base;
    a keyboard comprising a clipping portion;
    wherein the second magnetic member is moveable relative to the base between a first position and a second position; and
    wherein when the second magnetic member is located on the first position, a first repulsive force between the first magnetic member and the second magnetic member is less than an elastic force of the first resilient member on the first magnetic member, and the first resilient member urges the first magnetic member to engage with the clipping portion; when the second magnetic member is located on the second position, a second repulsive force between the first magnetic member and the second magnetic member is greater than the elastic force of the first resilient member on the first magnetic member, and the first magnetic member is moved to deform the first resilient member to disengage from the clipping portion.

2. The electronic device of claim 1, wherein the cover comprises a receiving portion, the receiving portion comprises a bottom panel and a top panel, the bottom panel is horizontal, the top panel is slanted relative to the bottom panel, and the first magnetic member is moveably received in the receiving portion and comprises a slanted surface abutting the top panel.

3. The electronic device of claim 2, wherein the receiving portion further comprises a connecting panel substantially perpendicular to the bottom panel, a first end of the first resilient member is secured to the connecting panel, and a second end of the first resilient member is secured to the first magnetic member.

4. The electronic device of claim 2, further comprising a second resilient member, wherein the second resilient member is secured to the second magnetic member, when the second magnetic member is located on the first position, the second resilient member is in an original state, and when the second magnetic member is located on the second position, the second resilient member is deformed.

5. The electronic device of claim 4, wherein the first resilient member is substantially perpendicular to the second resilient member.

6. The electronic device of claim 4, further comprising a pushing member, wherein the pushing member comprises a mounting portion, and the second magnetic member is received in the mounting portion.

7. The electronic device of claim 6, wherein the pushing member further comprises a pushing portion connected to the mounting portion, a first end of the second resilient member is engaged with the bottom panel, and a second end of the second resilient member is engaged with the pushing portion.

8. The electronic device of claim 6, wherein the base defines a through hole, and the mounting portion extends through the through hole to engage the second magnetic member to the bottom panel.

9. The electronic device of claim 1, wherein the first magnetic member is moveable in a first direction, and the second magnetic member is movable is in a second direction that is substantially perpendicular to the first direction.

10. An electronic device comprising:
    a cover;
    a first magnetic member moveably attached to the cover, and a first resilient member located between the cover and the first magnetic member;
    a base;
    a second magnetic member movable attached to the base;
    a keyboard comprising a clipping portion;
    the clipping portion engaged with the first magnetic member;
    wherein the second magnetic member is moveable relative to the base in a first direction that is substantially perpendicular to the base, to move the first magnetic member in a second direction that is substantially perpendicular to the first direction, so that the first magnetic member is disengaged from the clipping portion.

11. The electronic device of claim 10, wherein the cover comprises a receiving portion, the receiving portion comprises a bottom panel and a top panel, the bottom panel is horizontal, the top panel is slanted relative to the bottom panel, and the first magnetic member is moveably received in the receiving portion and comprises a slanted surface abutting the top panel.

12. The electronic device of claim 11, wherein the receiving portion further comprises a connecting panel substantially perpendicular to the bottom panel, a first end of the first resilient member is secured to the connecting panel, and a second end of the first resilient member is secured to the first magnetic member.

13. The electronic device of claim 12, further comprising a second resilient member, wherein the second resilient member is secured to the second magnetic member, when the second magnetic member is moveable relative to the base, the second resilient member is deformable.

14. The electronic device of claim 13, wherein the first resilient member is substantially perpendicular to the second resilient member.

15. The electronic device of claim 13, further comprising a pushing member, wherein the pushing member comprises a mounting portion, and the second magnetic member is received in the mounting portion.

16. The electronic device of claim 15, wherein the pushing member further comprises a pushing portion connected to the mounting portion, a first end of the second resilient member is engaged with the bottom panel, and a second end of the second resilient member is engaged with the pushing portion.

17. The electronic device of claim 15, wherein the base defines a through hole, and the mounting portion extends through the through hole to engage the second magnetic member to the bottom panel.

* * * * *